United States Patent
Chang

(10) Patent No.: US 11,054,730 B2
(45) Date of Patent: Jul. 6, 2021

(54) LIGHT SOURCE MODULE AND PROJECTION DEVICE

(71) Applicant: Coretronic Corporation, Hsin-Chu (TW)

(72) Inventor: Jui Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/716,507

(22) Filed: Dec. 17, 2019

(65) Prior Publication Data

US 2020/0192208 A1  Jun. 18, 2020

(30) Foreign Application Priority Data

Dec. 18, 2018 (CN) .......................... 201822120829.1

(51) Int. Cl.
*G03B 21/20* (2006.01)

(52) U.S. Cl.
CPC ..... *G03B 21/2033* (2013.01); *G03B 21/2013* (2013.01)

(58) Field of Classification Search
CPC ............ G03B 21/2033; G03B 21/2013; G03B 21/204; G03B 21/206; G03B 21/2006; G03B 21/20; G03B 21/14; G03B 21/00; G03B 21/2053; G03B 21/208; F21V 5/007; F21V 5/008; F21V 9/00
See application file for complete search history.

(56) References Cited

U.S. PATENT DOCUMENTS

| 2012/0249972 A1* | 10/2012 | Kurosaki | G03B 21/2013 353/31 |
| 2013/0002972 A1* | 1/2013 | Tanaka | G03B 21/2013 349/8 |
| 2013/0088471 A1* | 4/2013 | Kitano | G03B 21/2073 345/208 |
| 2017/0199450 A1* | 7/2017 | Matsubara | G03B 21/142 |

FOREIGN PATENT DOCUMENTS

| CN | 102375315 | 3/2012 |
| CN | 107430219 | 12/2017 |

* cited by examiner

*Primary Examiner* — Bao Q Truong
(74) *Attorney, Agent, or Firm* — JCIPRNET

(57) ABSTRACT

A light source module used in a projection device comprises a plurality of laser emitting elements and a light adjusting device. The laser emitting elements are configured to emit excitation beams. Each excitation beam is received by an optical system of the projection device to emit sub-beams. The light adjusting device comprises a plurality of light adjusting elements. The excitation beams penetrate through the light adjusting device and are output as output beams to be converted into illumination beams by the optical system. The light adjusting elements are disposed corresponding to at least some of the laser emitting elements with reference to the sub-beam light intensity distributions, so that the illumination beam light intensity distributions conform to a preset light intensity distribution. Furthermore, a projection device is provided and comprises at least one light source module, an optical system, at least one light valve and a projection lens.

10 Claims, 15 Drawing Sheets

LIGHT SOURCE MODULE AND PROJECTION DEVICE

CROSS-REFERENCE TO RELATED APPLICATION

This application claims the priority benefit of China application serial no. 201822120829.1 filed on Dec. 18, 2018. The entirety of the above-mentioned patent application is hereby incorporated by reference herein and made a part of this specification.

BACKGROUND OF THE INVENTION

1. Field of the Invention

The invention relates to a light source module and a projection device.

2. Description of Related Art

In a general laser projector, the laser light source module used in the laser projector is usually provided with optical guide elements to guide the laser beams emitted by laser elements to an optical system at the back end of the laser projector, the optical system converts the laser beams and emits illumination beams to at least one light valve, the at least one light valve converts the illumination beams into image beams, and a projection lens projects the image beams onto a screen to form an image.

However, in the above laser projector, in order to improve the uniformity of the image, the general method is to arrange fixed light diffusion elements in the optical system, but the fixed light diffusion elements will seriously influence the optical efficiency of the projector, in addition, it is difficult to make fine adjustment on the light intensity distribution of the image, and it is difficult to meet the needs of the users.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the present invention was acknowledged by a person of ordinary skill in the art.

SUMMARY OF THE INVENTION

The invention provides a light source module, and an image projected by a projection device using the light source module has good light uniformity and good optical efficiency.

The invention provides a projection device, and an image projected by the projection device has good light uniformity and good optical efficiency.

Other objectives and advantages of the present invention may be further understood from the technical features disclosed in the present invention.

An embodiment of the invention provides a light source module applied to a projection device. The projection device comprises an optical system. The light source module includes a plurality of laser emitting elements and a light adjusting device. The laser emitting elements are configured to emit excitation beams. Each excitation beam is received by an optical system to emit sub-beams. Each sub-beam has a sub-beam light intensity distribution. The light adjusting device is disposed between the optical system and the plurality of laser emitting elements, and the light adjusting device includes a plurality of light adjusting elements. The excitation beams emitted by the plurality of laser emitting elements penetrate through the light adjusting device and are output as output beams. The output beams are converted into illumination beams by the optical system. The illumination beams have illumination beam light intensity distributions. The plurality of light adjusting elements are disposed corresponding to at least some of the laser emitting elements with reference to the sub-beam light intensity distributions, so that the illumination beam light intensity distributions conform to a preset light intensity distribution.

An embodiment of the present invention provides a projection device which includes at least one light source module, an optical system, at least one light valve and a projection lens. The optical system is disposed on the transmission path of the output beams and converts the output beams into illumination beams. The at least one light valve is disposed on a transmission path of the illumination beams and converts the illumination beams into image beams. The projection lens is disposed on a transmission path of the image beams to project the image beams onto a projection medium.

Based on the above, in the light source module and the projection device of the embodiments of the present invention, because the light adjusting elements in the light adjusting device are disposed corresponding to at least some of the plurality of laser emitting elements with reference to the sub-beam light intensity distributions, the illumination beams converted from the output beams received by the optical system can conform to the preset light intensity distributions, and an image picture projected by the projection device can meet the needs of users and has good optical efficiency.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
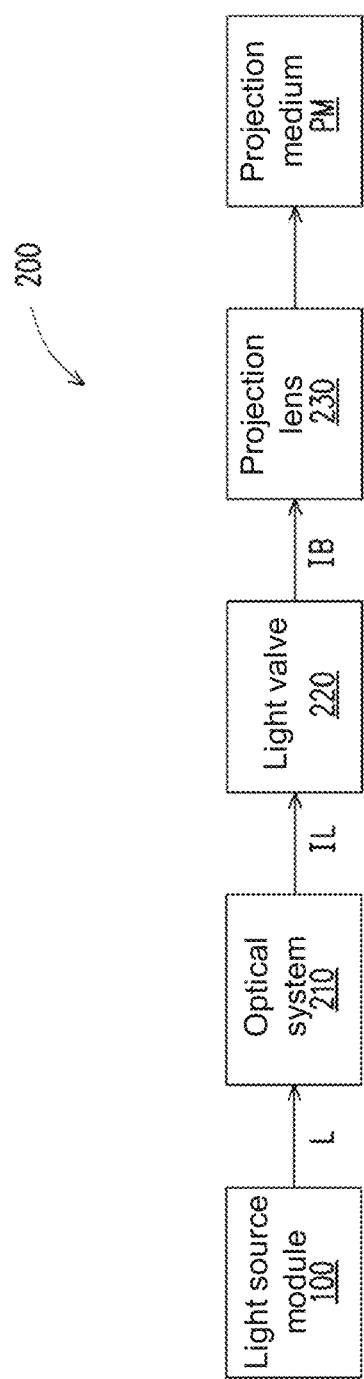
FIG. 1 is a block diagram of a projection device according to an embodiment of the invention.
Figure 2:
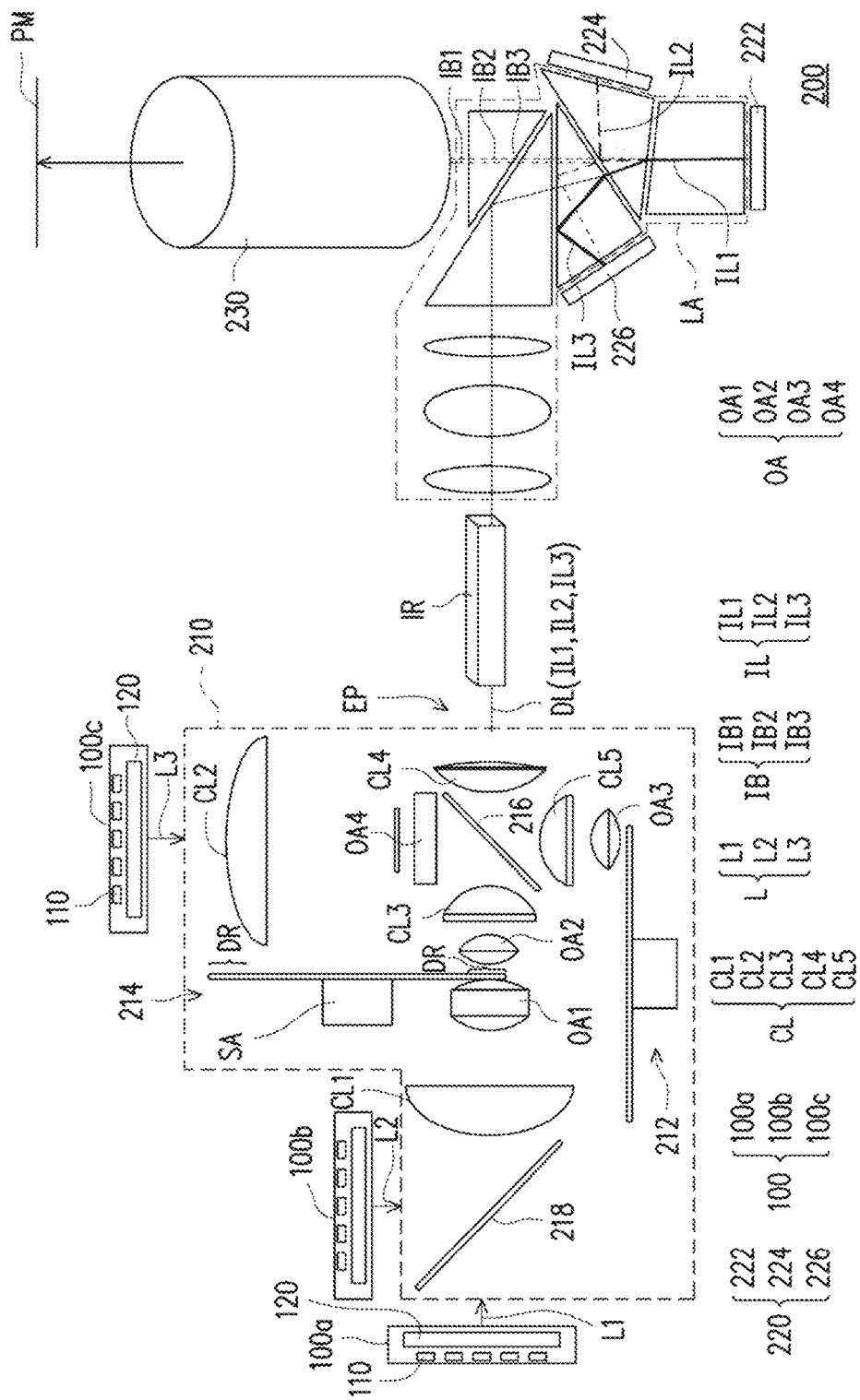
FIG. 2 is a specific architecture diagram of the projection device according to an embodiment of the invention.
Figure 3A:
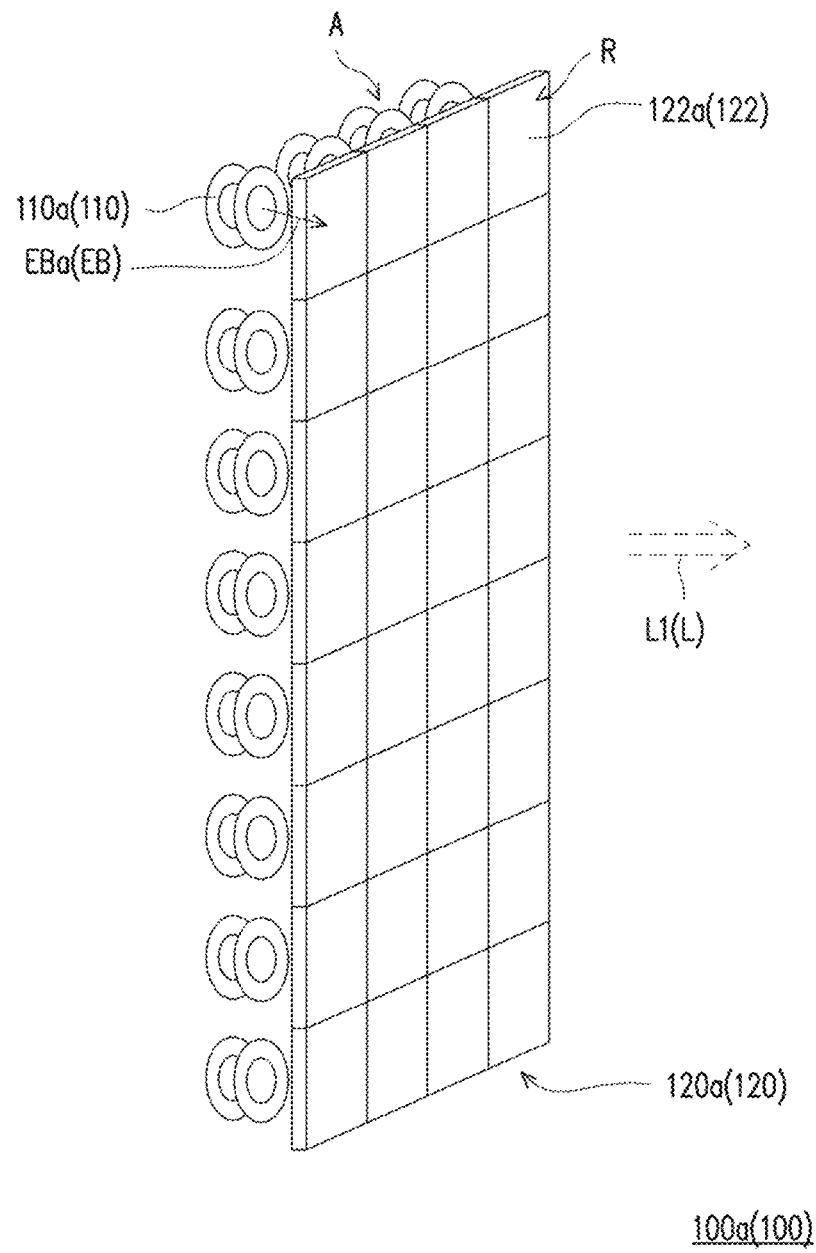
FIG. 3A is a schematic diagram of a light source module in FIG. 2.
Figure 3B:
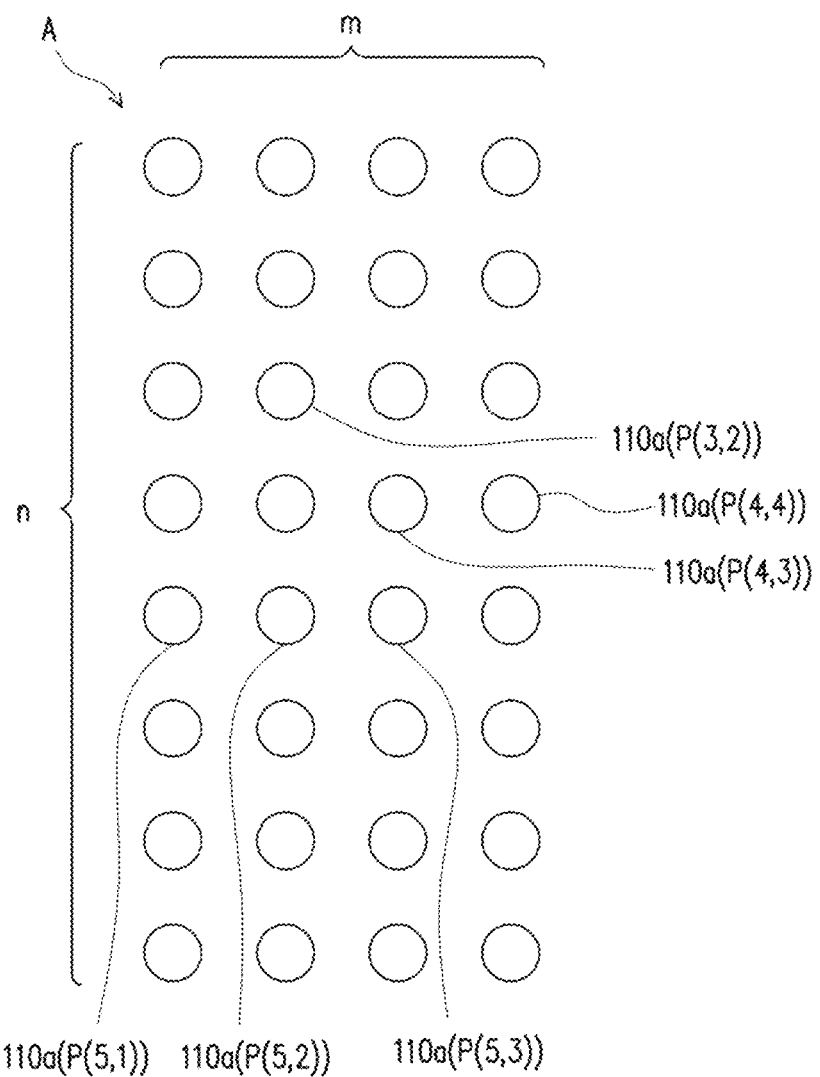
FIG. 3B is a top view of laser emitting elements in FIG. 3A.
Figure 3C:
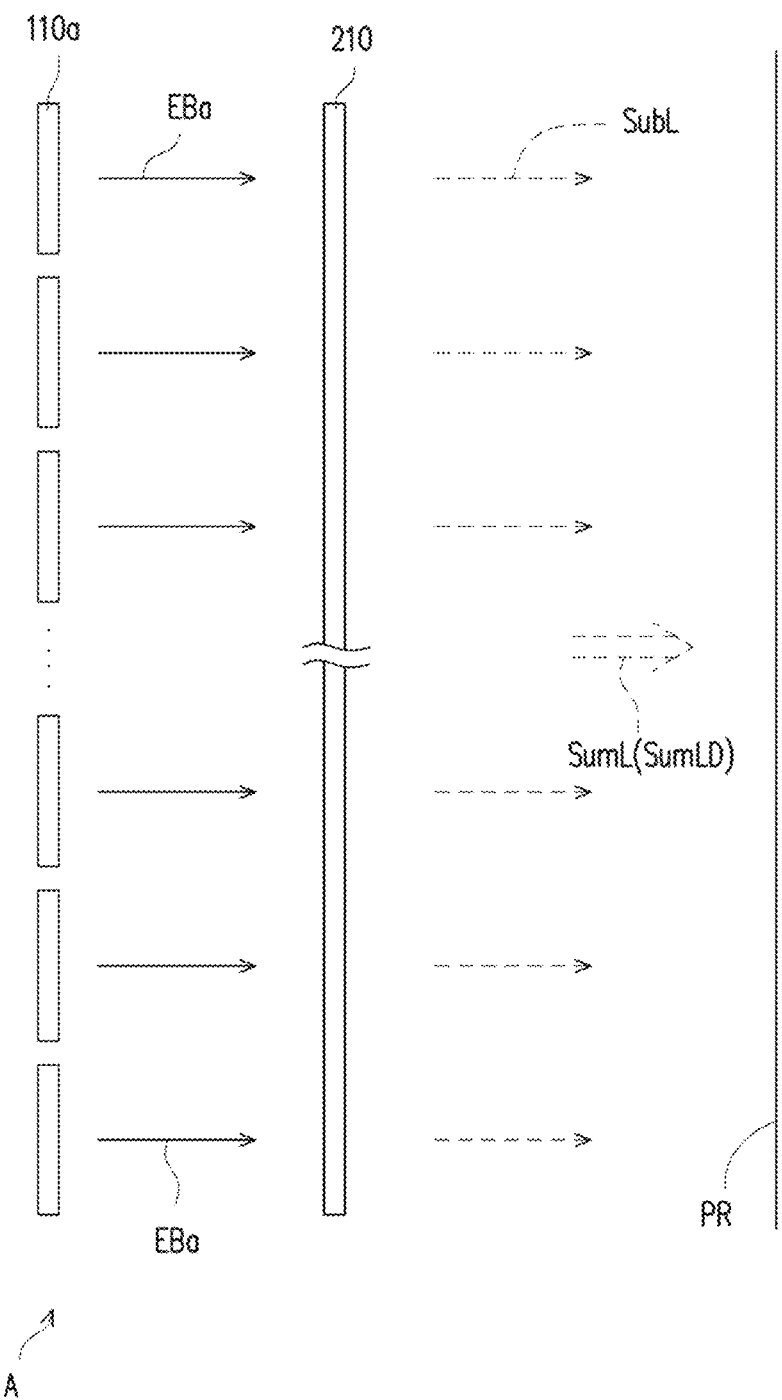
FIG. 3C is a brief schematic diagram of a light path provided with the laser emitting elements and an optical system.
Figure 3D:
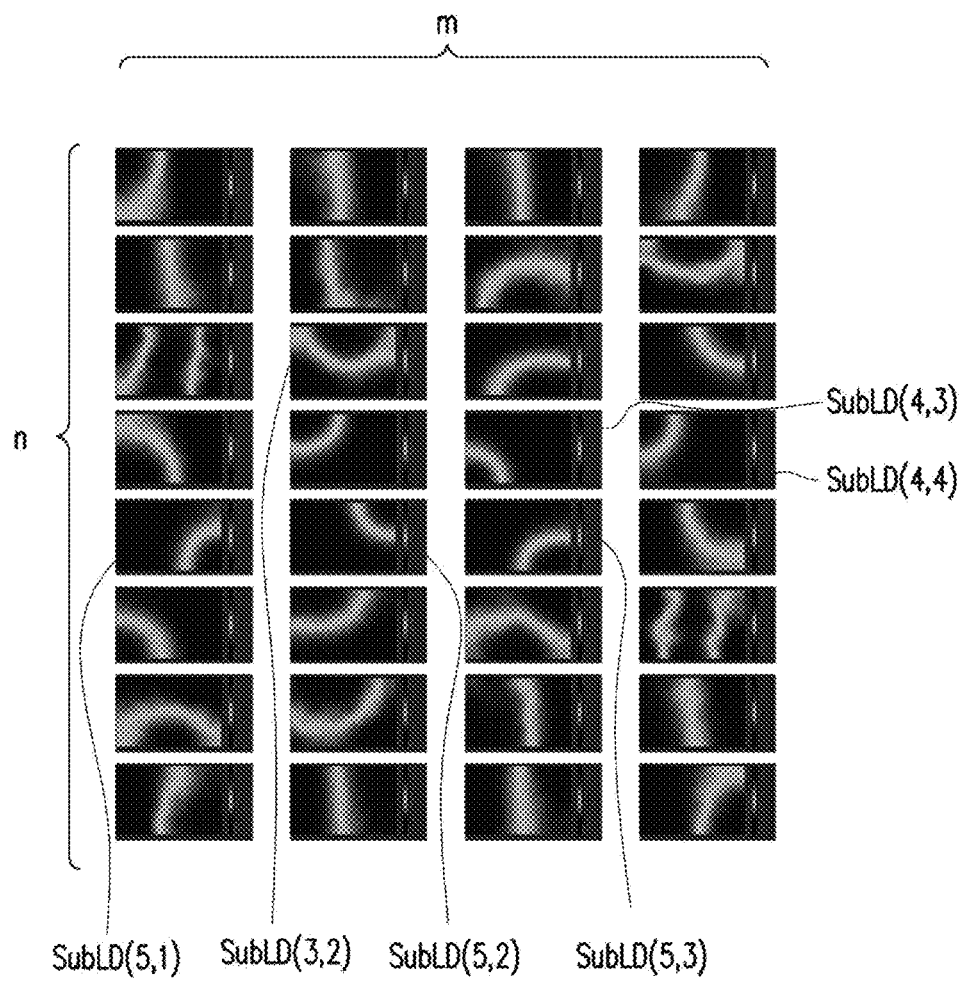
FIG. 3D shows sub-beam light intensity distributions corresponding to the laser emitting elements in different positions.
Figure 3E:
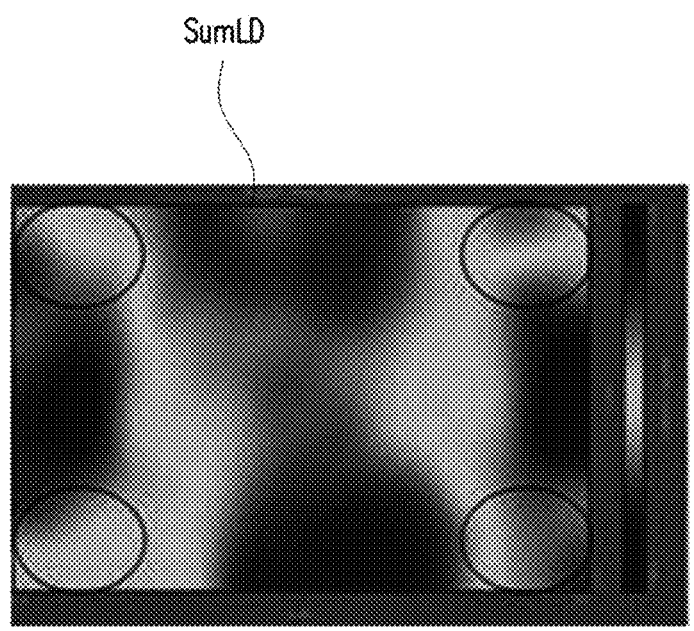
FIG. 3E shows a sum beam light intensity distribution.
Figure 3F:
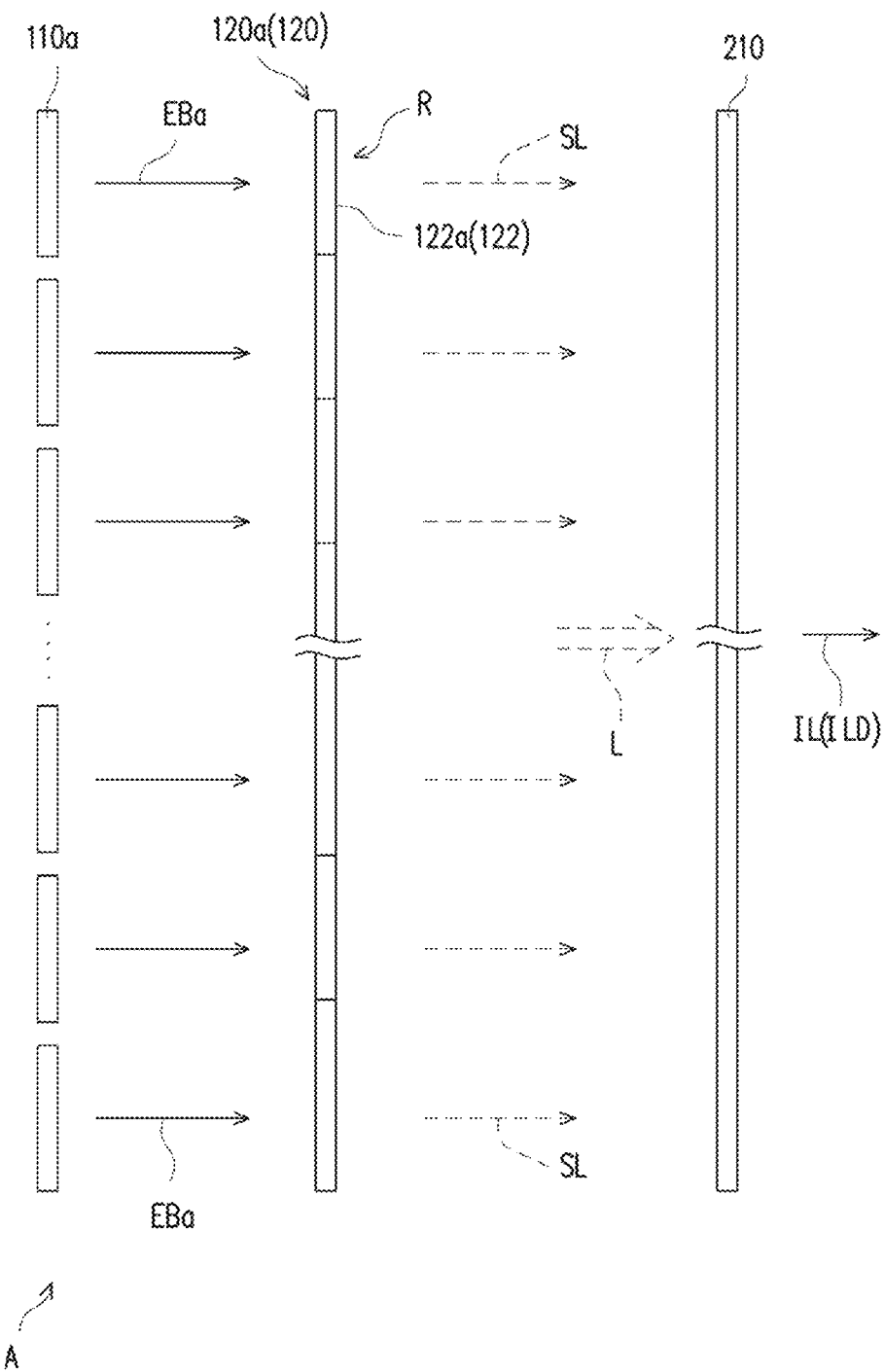
FIG. 3F is a brief schematic diagram of a light path provided with the laser emitting elements, a light adjusting device and the optical system.
Figure 4A:
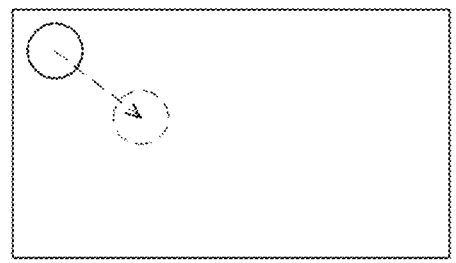
FIG. 4A to FIG. 4D are schematic diagrams for illustrating the optical effects of different types of light adjusting elements.
Figure 4B:
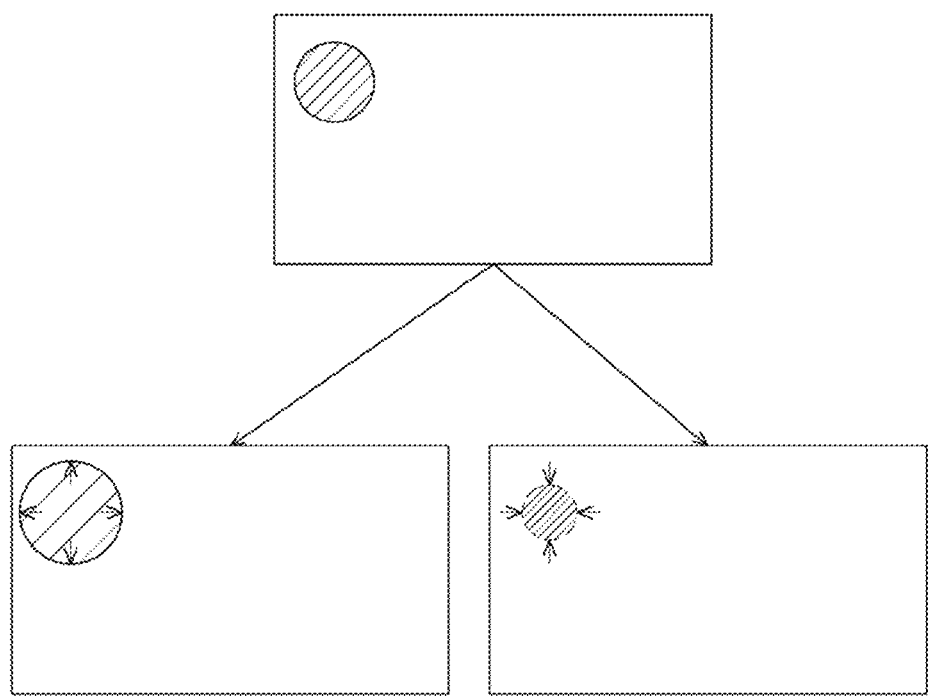
Figure 4C:
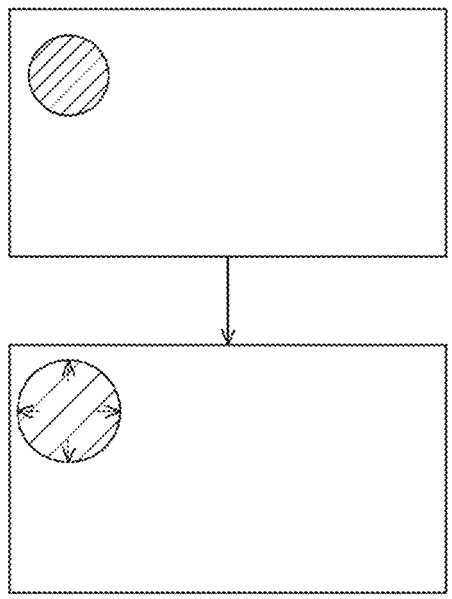
Figure 4D:
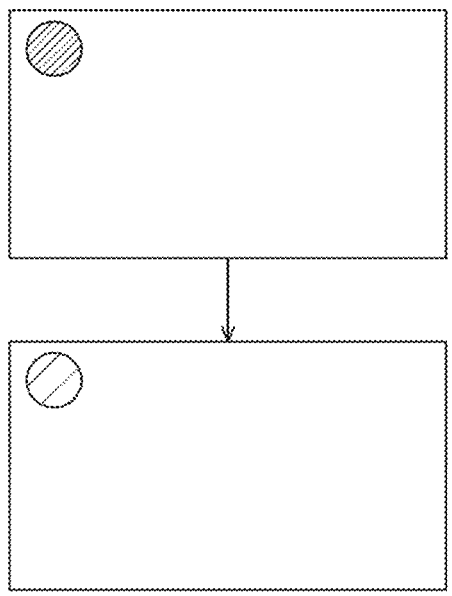
Figure 5:
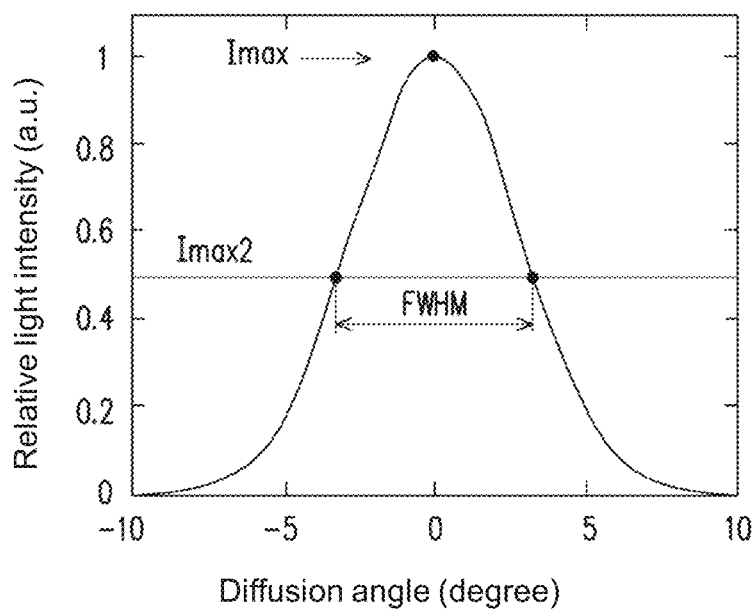
FIG. 5 is a relational schematic diagram of diffusion angles of output beams.

FIG. 1 is the block diagram of a projection device according to an embodiment of the invention. FIG. 2 is the specific architecture diagram of the projection device according to an embodiment of the invention. FIG. 3A is the schematic diagram of a light source module in FIG. 2. FIG. 3B is the top view of laser emitting elements in FIG. 3A. FIG. 3C is the brief schematic diagram of a light path provided with the laser emitting elements and an optical system. FIG. 3D is sub-beam light intensity distributions corresponding to the laser emitting elements in different positions. FIG. 3E shows the sum beam light intensity distribution. FIG. 3F is the brief schematic diagram of a light path provided with the laser emitting elements, a light adjusting device and the optical system. FIG. 3G to FIG. 3J are the schematic diagrams for illustrating different coverage scopes of the light adjusting elements in the light adjusting device. FIG. 3K shows the illumination beam light intensity distributions conforming to the preset light intensity distributions. FIG. 4A to FIG. 4D are the schematic diagrams for illustrating the optical effects of different types of light adjusting elements. FIG. 5 is the relational schematic diagram of diffusion angles of output beams. It should be noted that the specific architecture of the optical system, the light valve and the projection lens of the projection device in FIG. 2 is merely an example, and the architecture thereof is not limited thereto.

Referring to FIG. 1, in the present embodiment, the projection device 200 mainly includes a light source module 100, an optical system 210, a light valve 220 and a projection lens 230. The light source module 100 is used for providing an output beam L. The optical system 210 is disposed on a transmission path of the output beam L. After the optical system 210 receives the output beam L, the output beam L can be converted into the illumination beam IL. The light valve 220 is disposed on a transmission path of the illumination beam IL and converts the illumination beam IL into image beam IB. The projection lens 230 then transmits the image beam IB onto a projection medium PM (such as a screen) to form an image.

Referring to FIG. 2, in the embodiment, the projection device 200 can be a projector with three light source modules 100, such as a light source module 100a, a light source module 100b and a light source module 100c respectively, wherein the light source module 100a and the light source module 100c can be a blue light source module respectively, and the light source module 100b can be a red light source module, but the invention is not limited thereto. The light source modules 100 are laser source modules. Each of the light source modules 100 (100a, 100b and 100c) includes a plurality of laser emitting elements 110 and a light adjusting device 120, but the invention is not limited thereto. In other embodiments, only the light source module 100a and the light source module 100b are provided with a light adjusting device 120. The optical system 210 mainly includes a wavelength conversion device 212, a light diffusion element 214, a light splitting element 216 and a light combining element 218. The above elements are illustrated in detail in the following sections.

The laser emitting element 110 is configured to emit excitation beams EB. Each of the laser emitting elements 110 includes a laser diode and an optical collimator (not shown) which being disposed on the light path of the excitation beam emitted from the laser diode. Taking the light source module 100a in FIG. 2 and FIG. 3A as an example, the excitation beams emitted by the plurality of laser emitting elements 110a (110) of the light source module 100a are blue excitation beams which have blue light spectra. The peak wavelength of the excitation beams is between 400 nm and 470 nm, wherein the peak wavelength is defined as the wavelength corresponding to the maximum light intensity. Referring to FIG. 3B, the laser emitting elements 110a are arranged in an array A with n rows and m columns. In the embodiment, 32 laser emitting elements 110a can be arranged side by side to form an array A with 8 rows and 4 columns, wherein the transverse direction in the array A is defined as a row, and the longitudinal direction in the array A is defined as a column, but the invention is not limited by the number and the arrangement mode. The laser emitting element 110a in a specific position in the array A is marked as 110*a* (P(x, y)), where x is a row and y is a column. Taking the laser emitting element 110*a* in the third row and the second column in the array A as an example, the laser emitting element 110*a* is marked as 110*a* (P(3,2)) in FIG. 3B.

Referring to FIG. 2 and FIG. 3A, the light adjusting device 120 includes a plurality of light adjusting elements 122 and is disposed between the optical system 210 and the laser emitting elements 110. The light adjusting elements 122 generally refer to various optical elements for adjusting the optical properties of beams. The light adjusting device 120 can be considered as a combined optical element assembly of the light adjusting elements 122. The optical properties can include but not limited to light intensity, light intensity distributions, light shapes or optical paths. The types of the light adjusting elements 122 can include but not limited to wedge elements, diffusion elements (diffusion sheets), Fresnel lenses or light filters. Referring to FIG. 4A to FIG. 4D for illustrating the optical effects of different types of light adjusting elements, solid lines indicate the beams which are not adjusted by the light adjusting elements, such as light spots formed by the excitation beams emitted from the laser emitting elements on the light incident surfaces of the corresponding light adjusting elements, dotted lines indicate the beams which are adjusted by the light adjusting elements, such as light spots formed by the excitation beams emitted from the light adjusting elements on the light emergent surfaces, and the oblique line density at selected positions indicates the density of light intensity. Referring to FIG. 4A, if wedge elements are selected as the light adjusting elements 122, the positions of the original beams can be adjusted to other places by means of deflection of the light path. Referring to FIG. 4B, if Fresnel lenses with a focusing function or Fresnel lenses with a dispersion function are selected as the light adjusting elements 122, the beams can be correspondingly converged (bottom right of FIG. 4B) or dispersed (bottom left of FIG. 4B). Referring to FIG. 4C, if diffusion elements (diffusion sheets) are selected as the light adjusting elements 122, the light intensity of the originally concentrated beams can be diffused. Referring to FIG. 4D, if light filters are selected as the light adjusting elements 122, the light intensity of the whole illumination region of the beams can be decreased. Referring to FIG. 3A, the arrangement region of each light adjusting element 122*a* can be considered as a light adjusting region R. Therefore, in the light source module 100, after the excitation beams EB penetrate through the light adjusting device 120, the optical properties of the excitation beams EB are adjusted by the light adjusting device 120, and then, the excitation beams EB are outputted as output beams L. The light source modules 100*a*, 100*b* and 100*c* respectively provide output beams L1, L2 and L3.

In the embodiment, the light source module 100*c* is similar to the light source module 100*a*, and the descriptions thereof are omitted herein. The light source module 100*b* is similar to the light source module 100*a*, and the main differences between the light source module 100*b* and the light source module 100*a* are as follows: the excitation beams emitted by the laser emitting elements (not shown) in the light source module 100*b* are red excitation beams which have red light spectra, and the peak wavelength is between 625 nm and 740 nm but not limited thereto. The output beams L1 and L3 provided by the light source modules 100*a* and 100*c* are blue output beams, and the output beam L2 provided by the light source module 100*b* are red output beam, wherein the output beam L1 and the output beam L3 can be blue excitation beams with different or identical peak wavelengths. In addition, in different embodiments, technicians in the present field can correspondingly set different numbers of laser emitting elements 110 in the light source module 100 according to needs. In other words, the numbers of the laser emitting elements 110 disposed in the light source modules 100*a*, 100*b* and 100*c* can be different from each other and are not limited in the invention.

The wavelength conversion device 212 is an optical element mainly used for converting short-wavelength beams passing through the wavelength conversion device 212 into long-wavelength converted beam relative to the short-wavelength beam. In the embodiment, the wavelength conversion device 212 is a phosphor wheel but is not limited thereto. In the embodiment, the phosphor wheel is provided with a photoluminescent material which can receive the short-wavelength beam and generate corresponding converted beam by virtue of photoluminescence. A photoluminescent material can be phosphor, the types of phosphor can be phosphor capable of exciting yellow light or phosphor capable of exciting green light, and the converted beam emitted by the phosphor excited by the excitation beam is yellow beam or green beam correspondingly. In the embodiment, the wavelength conversion device 212 is disposed on the transmission path of the output beam L3 (blue excitation beam), and the phosphor can be excited by the output beam L3 to generate the converted beam. The invention is not limited thereto.

The light diffusion element 214 is an optical element for diffusing or scattering the beams passing through the light diffusion element, such as a diffusor wheel, a vibration diffuser, a diffusion plate or a diffuser of other moving parts, but not limited thereto. In the embodiment, the light diffusion element 214 is a movable diffusor wheel which is provided with a rotating shaft SA and a diffusion region DR. The diffusion region DR is provided with a light diffusion structure (not shown). The rotating shaft SA is driven by a motor (not shown) to enable the light diffusion element 214 to rotate by taking the rotating shaft SA as a center of rotation, so that the light diffusion structure in the diffusion region DR rotates.

The light splitting element 216 is an optical element with a light splitting function. The light splitting element 216 is a dichroic mirror (DM) which has wavelength selectivity and is a color separation filter for light splitting by utilizing the wavelength (color), but is not limited thereto. In the embodiment, the light splitting element 216 is used for enabling the output beams L1, L2 and L3 to penetrate through and reflecting the converted beam L4.

The light combining element 218 is an optical element with a light combining function and is also a dichroic mirror but not limited thereto. In the embodiment, the light combining element 218 enables the output beam L1 to penetrate therethrough and reflects the output beam L2, so as to transmit the output beam L1 and the output beam L2 to the light diffusion element 214.

The light valve 220 is any one of spatial light modulators, such as a digital micro-mirror device (DMD), a liquid-crystal-on-silicon panel (LCOS Panel) or a liquid crystal panel (LCD). In the embodiment, the light valve 220 is the DMD, and the number of the light valve 220 is, for example, but not limited thereto. The light valve 220 is disposed on the transmission path of the illumination beam IL and converts the illumination beam IL into the image beam IB.

The projection lens 230 includes a combination of one or more optical lenses having diopter, such as various combinations of non-planar lenses including a biconcave lens, a biconvex lens, a concave-convex lens, a convex-concave lens, a plano-convex lens, a plano-concave lens and the like. In one embodiment, the projection lens 230 also includes a planar optical lens. The invention does not limit the shape and type of optical lenses of the projection lens 230. The projection lens 230 is disposed on the transmission path of the image beam IB. In the embodiment, the projection lens 230 is used for projecting the image beam IB onto a projection medium PM. The projection medium PM can be a projection screen or a projection wall, and the invention is not limited thereto.

In addition, in the embodiment, one or more condensing lenses CL (CL1 to CL5) or one or more optical collimators OA (OA1 to OA4) can be additionally disposed inside the optical system 210 selectively. In detail, the condensing lens CL is a lens with a condensing function, such as a convex lens. The optical collimator OA is used for converting divergent beams/convergent beams into parallel beams parallel to the optical axis of the optical collimator OA. By additionally arranging the condensing lens CL and the optical collimator OA, the quality of the beams output by the optical system 210 can be further improved, and the invention is not limited thereto. Furthermore, in the embodiment, an integration rod IR and an optical lens set LA also can be additionally disposed inside the projection device 200 selectively. The integration rod IR is used for homogenizing the incident illumination beams IL. One or more condensing lenses or one or more beam splitter prism sets are disposed inside the optical lens set LA and are mainly used for guiding the illumination beams IL of different colors to light valves 222, 224 and 226 disposed at different positions.

In the following sections, FIG. 3B to FIG. 3G illustrate the arrangement relationship between the laser emitting elements 110a and the light adjusting device 120a in the light source module 100a as shown in FIG. 3A.

Referring to FIG. 3C, firstly, under the condition that the excitation beam EBa emitted by each laser emitting element 110a of the light source module without passing through the light adjusting device 120 (but may pass through glass (not shown)), the excitation beams EBa can be directly received by the optical system 210, and after receiving the excitation beams EBa, the light beam projected by the optical system 210 is called a sub-beam SubL, and the corresponding sub-beam SubL have a sub-beam light intensity distribution SubLD on the projection region PR. The laser emitting elements 110a at different positions in the array A in FIG. 3A respectively form the corresponding sub-beam light intensity distributions SubLD in the projection region PR as shown in FIG. 3D. Then, under the condition that the excitation beams EBa without passing through the light adjusting device 120 (but may pass through glass (not shown)), these excitation beams EBa can be received by the optical system 210 to project a plurality of sub-beams SubL to obtain a sum beam SumL, and the corresponding sum beam SumL have a sum beam light intensity distribution SumLD on the projection region PR, as shown in FIG. 3E. The sum beam light intensity distribution SumLD can be considered as the sum of the sub-beam light intensity distributions SubLD. The projection region PR can be the light emergent surface of the integration rod IR, the imaging surface of the light valve 220 or the projection medium PM and is not limited thereto.

Simultaneously referring to FIG. 3B and FIG. 3D, the positions of the sub-beam light intensity distributions SubLD in FIG. 3D respectively correspond to the positions of the laser emitting elements 110a in FIG. 3B. For example, the sub-beam light intensity distribution SubLD(3,2) in the third row and the second column in FIG. 3D is the light intensity distribution SubLD of the sub-beam SubL formed from the excitation beam EB emitted by the laser emitting element 110a (P(3,2)) in the third row and the second column in FIG. 3B through the optical system 210, and so on. It should be noted that each sub-beam light intensity distribution SubLD in FIG. 3D represents the light intensity distribution of the same projection region PR. Each sub-beam light intensity distribution SubLD can be considered as the degree of influence on the light intensity of a light emergent picture before the corresponding laser emitting element 110a after being adjusted by the light adjusting device 120a. The sum beam light intensity distribution SumLD represents the sum of the sub-beam light intensity distributions SubLD which are not adjusted by the light adjusting device 120.

Subsequently, in the embodiment, the plurality of light adjusting elements 122a of the light adjusting device 120a are disposed corresponding to at least a portion of the laser emitting elements 110a with reference to the sub-beam light intensity distributions SubLD (as shown in FIG. 3D), so that the illumination beam light intensity distribution ILD converted by the optical system 210 conform to the preset light intensity distribution (as shown in FIG. 3F). The arrangement modes of the light adjusting elements 122a of the light adjusting device 120a are illustrated below according to different preset light intensity distributions.

In an embodiment, the preset light intensity distribution meets the condition that the light intensity difference between any two positions of the illumination beam light intensity distribution ILD is less than 10%, and light intensity distributions of back-end images are homogenized. Therefore, in order to meet the above light intensity difference condition, one possible optical design mode is illustrated below.

Firstly, referring to the sum beam light intensity distribution SumLD in FIG. 3E, the light intensity distribution of the whole projection region PR can be found, specifically, the light intensity at the left and right sides of the projection region PR is weaker, and the light intensity at the upper side of the projection region PR and extending to the lower side is stronger.

Then, find the sub-beam light intensity distribution SubLD having a large influence on the light intensity at the left and right sides of the projection region PR (that is, the light intensity is concentrated at the left and right sides of the projection region PR) referring to the sub-beam light intensity distributions SubLD in FIG. 3D. Then the light adjusting region R in front of the corresponding laser emitting element 110a can be provided with a diffusion sheet (light adjusting element) with a weaker light diffusion effect, that is, the transmission path of the excitation beam EBa emitted by the corresponding laser emitting element 110a is provided with the diffusion sheet (light adjusting element) with a weaker light diffusion effect, therefore, the corresponding laser emitting element 110a has a smaller degree of diffusion in the scope of light intensity distributions at the left and right sides of the projection region PR.

On the other hand, find the sub-beam light intensity distribution SubLD having a large influence on the light intensity at the upper side of the projection region PR and extending to the lower side (that is, the light intensity is concentrated at the upper and lower sides of the projection region PR) referring to FIG. 3D. Then the light adjusting region R in front of the corresponding laser emitting element 110a can be provided with a diffusion sheet (light adjusting element) with a stronger light diffusion effect, that is, the transmission path of the excitation beam EBa emitted by the corresponding laser emitting element 110a is provided with the diffusion sheet (light adjusting element) with a stronger light diffusion effect, therefore, the corresponding laser emitting element 110a has a larger degree of diffusion in the scope of light intensity distributions at the upper side of the projection region and extending to the lower side.

Figure 3G:
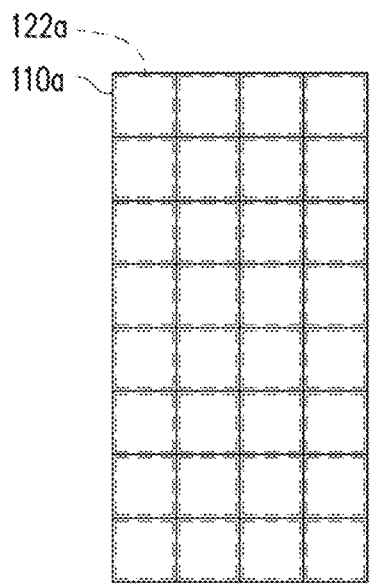
FIG. 3G to FIG. 3J are schematic diagrams for illustrating different coverage scopes of the light adjusting elements in the light adjusting device.

Based on the above, referring to FIG. 3A, FIG. 3F and FIG. 3G, the solid lines in FIG. 3G represent the coverage scope of the laser emitting elements 110a, and the dotted lines represent the coverage scope of the light adjusting elements 122a. In the above optical design mode, the light adjusting elements 122a can be disposed in a one-to-one correspondence manner on the transmission path of the excitation beams EBa emitted by the laser emitting elements 110a, and the light adjusting elements 122a can be diffusion sheets with different light diffusion capabilities. Each excitation beam EBa can be adjusted by the corresponding light adjusting element 122a to correspondingly output a sub-output beam SL (as shown in FIG. 3F). The sum of the sub-output beams SL can be considered as the output beams L of the light adjusting device 120a. The illumination beam light intensity distributions ILD of the illumination beams IL converted from the output beams L by the optical system 210 meet the conditions of the preset light intensity distributions. Therefore, the output beams L output by the light adjusting device 120a can enable the illumination beam light intensity distributions ILD of the illumination beams IL converted by the optical system 210 to be homogenized.

In addition, referring to FIG. 5, in the embodiment, the diffusion angle of the output beam L is defined as half of the angular scope of the full width at half maximum (FWHM) of the light intensity distribution thereof, and the scope of the diffusion angle is less than or equal to 2 degrees. Imax represents the maximum value in the light intensity distributions of the output beams. Imax2 represents half of the maximum value in the light intensity distributions of the output beams.

It should be noted that in order to meet the above conditions of the light intensity difference, it is only an exemplary optical design mode to provide the diffusion sheets with different light diffusion effects. Other optical design modes are illustrated in the following sections.

In other optical design modes, the same type light adjusting elements with different optical effects can be disposed in front of each laser emitting element 110a. For example, in one optical design mode, referring to the sub-beam light intensity distributions SubLD and the sum beam light intensity distribution SumLD in FIG. 3D and FIG. 3E, wedge elements with different beam deflection capabilities, different Fresnel lenses or light filters with different light filtering capabilities are respectively disposed in front of the laser emitting elements 110a to form the light adjusting device 120a, thereby achieving the effect of homogenizing the illumination beam light intensity distributions ILD of the illumination beams IL. The invention is not limited thereto.

In another optical design mode, different types of light adjusting elements can be disposed in front of each laser emitting element 110a. For example, the light adjusting device 120a can be an assembly of different types of light adjusting elements such as wedge elements, Fresnel lenses, diffusion sheets or light filters, thereby achieving the effect of homogenizing the illumination beam light intensity distributions ILD of the illumination beams IL. The invention is not limited thereto.

Figure 3H:
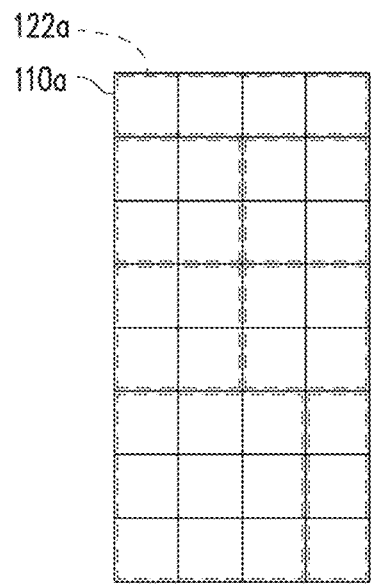
Figure 3I:
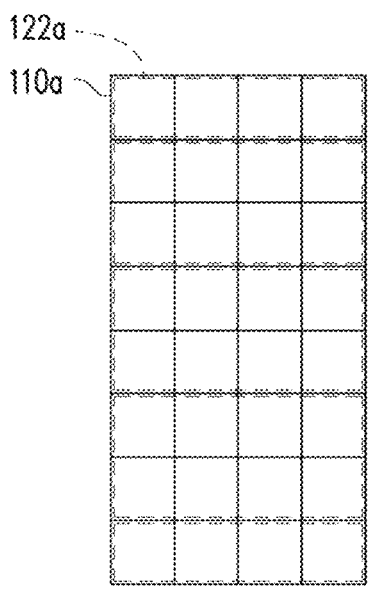

In the above optical design mode, the light adjusting elements 122a have a one to one correspondence with the laser emitting elements 110a. In other embodiments, the light adjusting elements 122a have a one-to-many correspondence with the laser emitting elements 110a. Referring to FIG. 3H to FIG. 3I, in the present optical design mode, light adjusting elements 122a having different correspondences with the laser emitting elements 110a can be disposed at the dotted lines, that is, one light adjusting element 122a can correspond to a plurality of laser emitting elements 110a. Therefore, the excitation beams EB emitted by some of laser emitting elements 110a corresponding to the light adjusting element 122a can be subjected to light adjustment by the light adjusting element 122a. The technicians in the present field can correspondingly set light adjusting elements with different optical parameters or types in different scopes according to the sub-beam light intensity distributions SubLD and the sum beam light intensity distribution SumLD. The invention is not limited thereto.

Figure 3J:
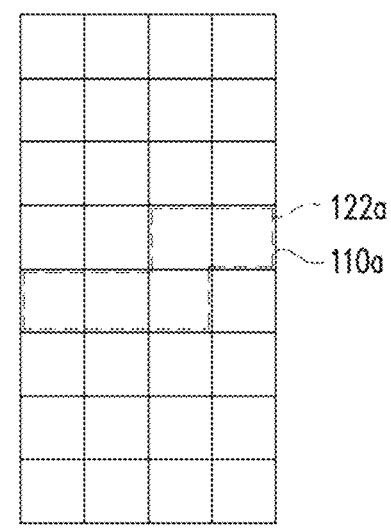
Figure 3K:
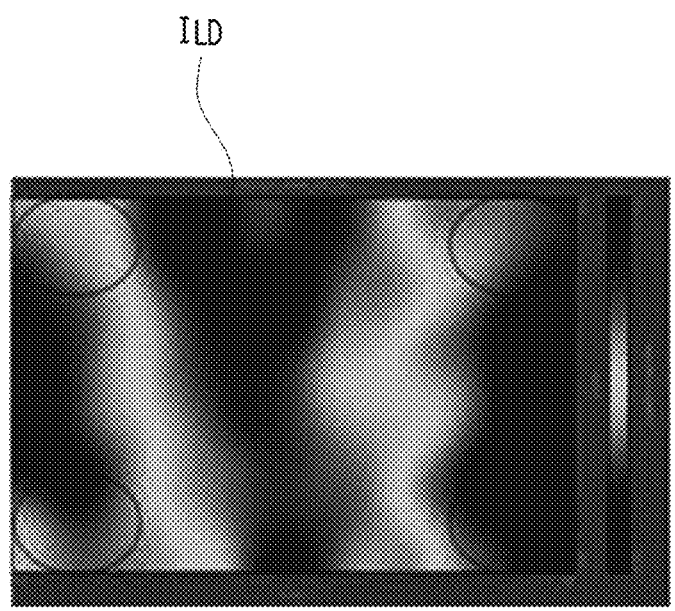
FIG. 3K shows illumination beam light intensity distributions conforming to the preset light intensity distributions.

In addition, the light adjusting device 120a does not necessarily only meet the above preset light intensity distribution. In another preset light intensity distribution, it is also possible to weaken the regional light intensity of the illumination beam light intensity distributions ILD. For example, referring to the sum beam light intensity distribution SumLD in FIG. 3E, it can be found that the light intensity of some specific regions is too strong relative to the light intensity of other regions and needs to be weakened. Therefore, referring to the sub-beam light intensity distributions SubLD in FIG. 3D, it can be known which laser emitting elements 110a have greater influence on the light intensity of the specific region, and then, the corresponding light adjusting element 122a is disposed in front of the corresponding laser emitting element 110a. For example, if it is considered that the light intensity at the four corners of the sum beam light intensity distribution SumLD in FIG. 3E is too strong, referring to the sub-beam light intensity distributions SubLD in FIG. 3D, it is found that the sub-beam light intensity distributions SubLD(4,3), SubLD(4,4), SubLD(5,1), SubLD(5,2) and SubLD(5,3) have greater influence on the light intensity of the four corners, therefore, the light adjusting elements 122a can be disposed in front of the corresponding laser emitting elements 110a(P(4,3)), 110a(P(4,4)), 110a(P(5,1)), 110a(P(5,2)) and 110a(P(5,3)) as shown in FIG. 3B to weaken the influence of the laser emitting elements 110a on the light intensity, and the correspondence relationship of the light adjusting elements 122a and the laser emitting elements 110a can be as shown in FIG. 3J (other regions not selected by the dotted lines are not provided with the light adjusting elements) to enable the illumination beam light intensity distributions ILD of the illumination beams IL projected by the optical system 210 to reach the light intensity distribution as shown in FIG. 3K.

Therefore, by virtue of the above arrangement mode, the arrangement mode of the light adjusting device 120 and the laser emitting elements 110 of the light source module 100 in the embodiment can be designed according to the sub-beam light intensity distributions SubLD so as to meet different needs of users.

Based on the above, in the light source module 100 of the embodiment of the invention, because the light adjusting elements 122 in the light adjusting device 120 are disposed corresponding to at least some of the plurality of laser emitting elements 110 with reference to the sub-beam light intensity distributions SubLD, after the optical system 210 positioned at the downstream side of the light path of the excitation beam emitted from the light source module 100 receives the output beams L adjusted by the light adjusting device 120, the illumination beams IL converted from the output beams L can conform to the preset light intensity distributions. Therefore, the projection device 200 can further finely adjust the light intensity of the image picture to meet the needs of the users, and the projection device 200 has good optical efficiency.

Figure 6:
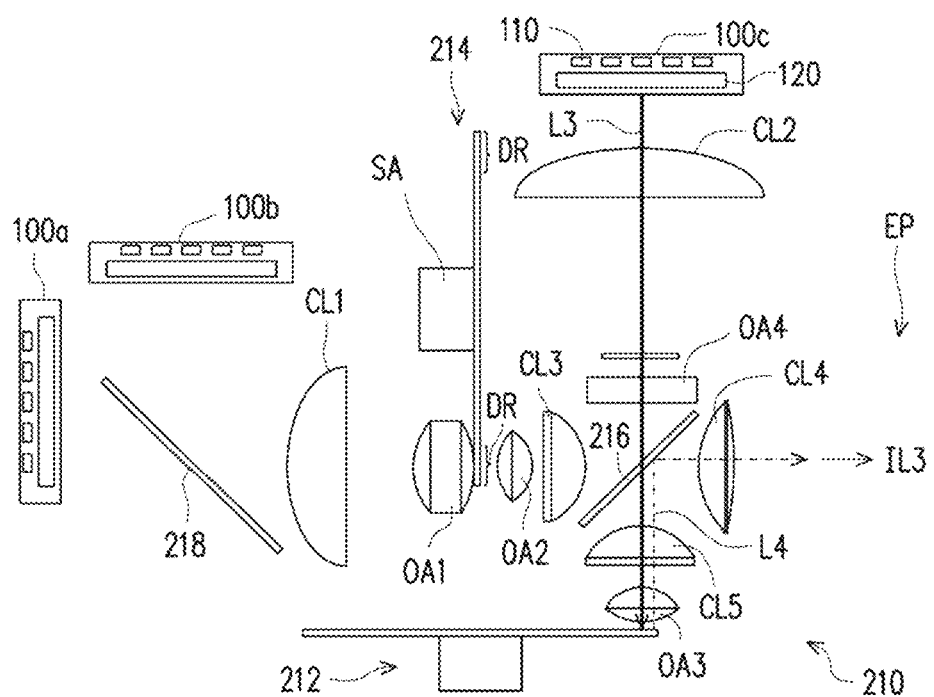
FIG. 6 to FIG. 8 are schematic diagrams of light paths in the projection device in FIG. 2 when different light source modules are operated.
Figure 7:
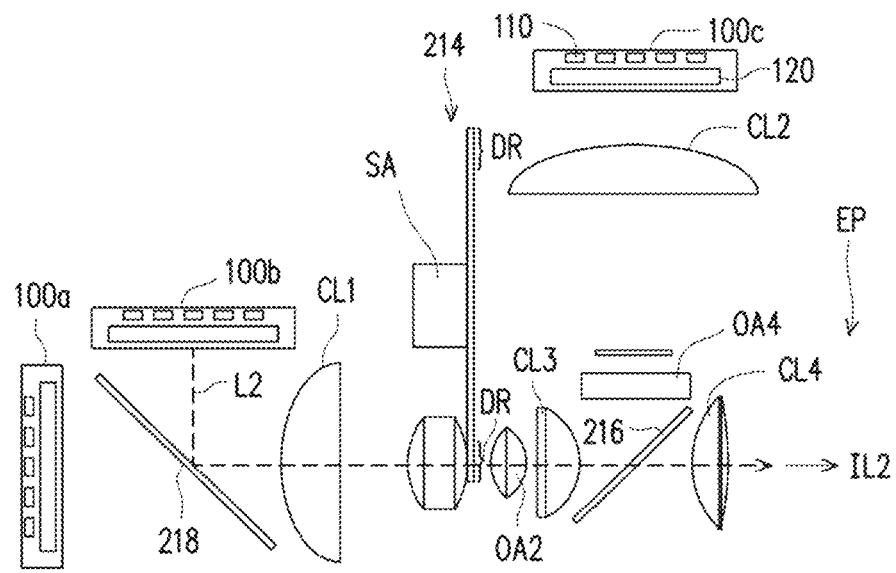
Figure 8:
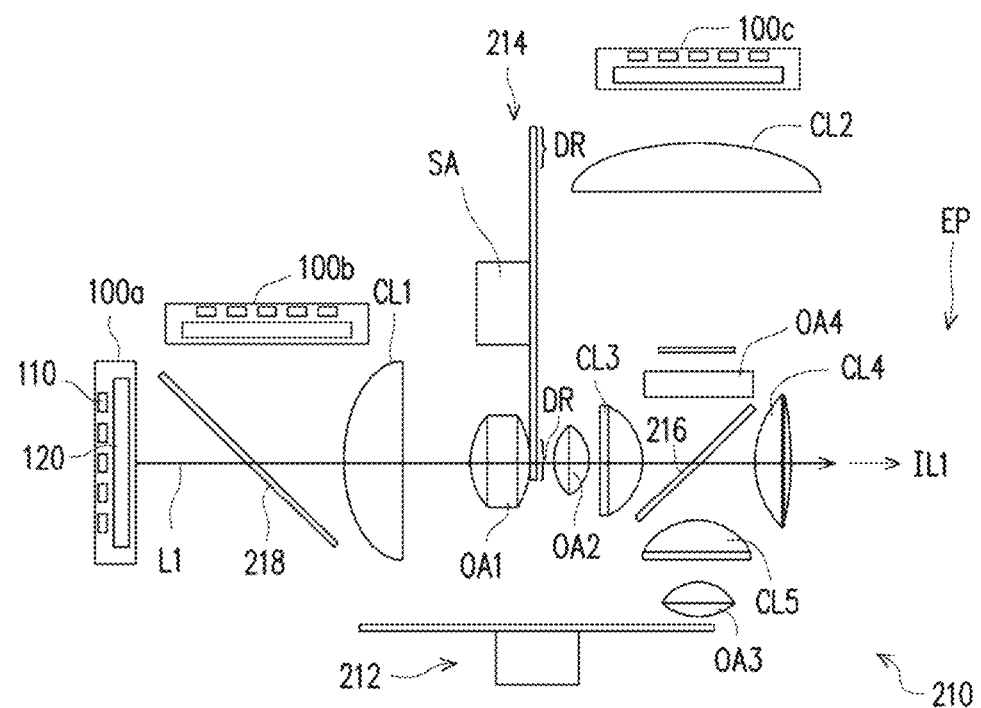

FIG. 6 to FIG. 8 are the schematic diagrams of the light paths in the projection device in FIG. 2 when different light source modules are operated.

The transmission path of each beam in the projection device 200 is illustrated in detail in the following sections.

Referring to FIG. 6, when the light source module 100c provides the output beam L3, the output beam L3 sequentially passes through the condensing lens CL2, the optical collimator OA4, the light splitting element 216, the condensing lens CL5 and the optical collimator OA3 and is transmitted to the wavelength conversion device 212. Then, the wavelength conversion device 212 is excited by the output beam L3 to emit the converted beam L4. The converted beam L4 sequentially passes through the optical collimator OA3 and the condensing lens CL5, is transmitted to the light splitting element 216, reflected by the light splitting element 216 and then transmitted to the condensing lens CL4, and exits from light exit point EP. That is, the optical system 210 converts the output beam L3 into the converted beam L4 and then emits the converted beam L4 to serve as the illumination beam IL3. In the embodiment, the light exit point EP can be the positions at which the beams exit from the optical system 210.

Referring to FIG. 7, when the light source module 100b provides the output beam L2, the output beam L2 is reflected by the light combining element 218. Then the output beam L2 sequentially passes through the condensing lens CL1, the optical collimator OA1, the diffusion region DR of the light diffusion element 130, the optical collimator OA2 and the condensing lens CL3, penetrates through the light splitting element 216, and then is transmitted to the condensing lens CL4 and exits from the light exit point EP. That is, the optical system 210 guides the output beam L2 and then emits the output beam L2 to serve as the illumination beam IL2.

Referring to FIG. 8, when the light source module 100a provides the output beam L1, the output beam L1 sequentially passes through the light combining element 218, the condensing lens CL1, the optical collimator OA1, the diffusion region DR of the light diffusion element 214, the optical collimator OA2 and the condensing lens CL3, is transmitted to the light splitting element 216 and then transmitted to the condensing lens CL4, and exits from the light exit point EP. That is, the optical system 210 guides the output beam L1 and then emits the output beam L1 to serve as the illumination beam IL1.

Referring to FIG. 7 and FIG. 8, it is worth mentioning that when the output beams L1 and L2 pass through the diffusion region DR, the output beams L1 and L2 are diffused or scattered by the light diffusion structure in the diffusion region DR so as to reduce the energy density of the excitation beams. Furthermore, the light diffusion element 214 can reduce the phenomenon of laser speckles by means of rotation.

Referring to FIG. 2, the illumination beams IL1, IL2 and IL3 are emitted from the optical system 210 to together form an integrated beam DL. The integrated beam DL sequentially passes through the integration rod IR and the optical lens set LA. By virtue of the optical lens set LA, the illumination beam IL1 in the integrated beams IL are transmitted to the light valve 222, the illumination beams IL2 in the integrated beams IL are transmitted to the light valve 224, and the illumination beams IL3 in the integrated beams IL are transmitted to the light valve 226. The light valves 222, 224 and 226 respectively convert the illumination beams IL1, IL2 and IL3 into image beams IB1, IB2 and IB3. Then, the image beams IB1, IB2 and IB3 are transmitted onto the projection medium PM through the optical lens set LA and the projection lens 230 so as to form a projection picture.

Based on the above, in the projection device 200 of the embodiment of the invention, because the design of the light source modules 100a, 100b and 100c is adopted, fine adjustment can be performed on the image beams IB1, IB2 and IB3 with different colors to meet the needs of the users, and the optical efficiency is good. For example, the projection device 200 can enable the image beams IB1, IB2 and IB3 to have better uniformity, or the projection device 200 can regionally adjust the light intensity distribution of any one of the image beams IB1, IB2 and IB3. The present invention is not limited thereto.

In conclusion, in the light source module and the projection device of the embodiments of the invention, because the light adjusting elements in the light adjusting device are disposed corresponding to at least some of the plurality of laser emitting elements with reference to the sub-beam light intensity distributions, the illumination beams converted from the output beams received by the optical system can conform to the preset light intensity distributions, and the image picture projected by the projection device can meet the needs of the users and has good optical efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module applied to a projection device, wherein the projection device comprises an optical system, and the light source module comprises a plurality of laser emitting elements and a light adjusting device, wherein
each of the plurality of laser emitting elements is configured to emit excitation beam; and
each of the plurality of excitation beams is received by the optical system to emit a sub-beam, and each of the sub-beams is provided with a sub-beam light intensity distribution; and
the light adjusting device is disposed between the optical system and the plurality of laser emitting elements, the light adjusting device comprises a plurality of light adjusting elements, the plurality of excitation beams emitted by the plurality of laser emitting elements penetrate through the light adjusting device and is outputted as an output beam, the output beam is converted into an illumination beam by the optical system, and the illumination beam is provided with illumination beam light intensity distributions, wherein
the plurality of light adjusting elements are disposed corresponding to at least a portion of the plurality of laser emitting elements with reference to the plurality of sub-beam light intensity distributions, so that the illumination beam light intensity distribution conforms to a preset light intensity distribution, and
the plurality of light adjusting elements comprise diffusion sheets with different light diffusion capabilities or light filters with different light filtering capabilities, wherein the plurality of light adjusting elements have a one-to-one correspondence with the plurality of laser emitting elements such that each one of the plurality of light adjustment elements corresponds to the corresponding one of the plurality of laser emitting elements, and the each one of the plurality of light adjustment elements is located on a transmission path of the corresponding excitation beam emitted by the corresponding one of the plurality of laser emitting elements.

2. The light source module according to claim 1, wherein the plurality of excitation beams are received by the optical system to emit a sum beam, the sum beam is provided with a sum beam light intensity distribution, and the plurality of light adjusting elements are disposed corresponding to a portion of the plurality of laser emitting elements according to uniformity of the sum beam light intensity distribution and with reference to uniformity of each sub-beam light intensity distribution.

3. The light source module according to claim 1, wherein the preset light intensity distribution is a condition: the illumination beam light intensity distribution meet that a difference value of light intensity in any two different positions is less than 10%.

4. The light source module according to claim 1, wherein the plurality of laser emitting elements are disposed in an array.

5. The light source module according to claim 1, wherein a diffusion angle of the output beam is less than or equal to 2 degrees.

6. A projection device, comprising at least one light source module, an optical system, at least one light valve and a projection lens, wherein
the at least one light source module comprises a plurality of laser emitting elements and a light adjusting device; each of the plurality of laser emitting elements is configured to emit excitation beam, each of the plurality of excitation beams is received by the optical system to emit a sub-beam, and each of the sub-beam is provided with a sub-beam light intensity distribution; and the light adjusting device is disposed between the optical system and the plurality of laser emitting elements, the light adjusting device comprises a plurality of light adjusting elements, the plurality of excitation beams emitted by the plurality of laser emitting elements penetrate through the light adjusting device and are outputted as an output beam, the output beam is converted into an illumination beam by the optical system, the illumination beam is provided with illumination beam light intensity distribution, and the plurality of light adjusting elements are disposed corresponding to at least a portion of the plurality of laser emitting elements with reference to the plurality of sub-beam light intensity distributions, so that the illumination beam light intensity distribution conform to a preset light intensity distribution, and the plurality of light adjusting elements comprise diffusion sheets with different light diffusion capabilities or light filters with different light filtering capabilities, wherein the plurality of light adjusting elements have a one-to-one correspondence with the plurality of laser emitting elements such that each one of the plurality of light adjustment elements corresponds to the corresponding one of the plurality of laser emitting elements, and the each one of the plurality of light adjustment elements is located on a transmission path of the corresponding excitation beam emitted by the corresponding one of the plurality of laser emitting elements;
the optical system is disposed on a transmission path of the output beam and convert the output beam into an illumination beam;
the at least one light valve is disposed on a transmission path of the illumination beam and converts the illumination beam into an image beam; and
the projection lens is disposed on a transmission path of the image beams to project the image beams onto a projection medium.

7. The projection device according to claim 6, wherein the plurality of excitation beams are received by the optical system to emit a sum beam, the sum beam is provided with a sum beam light intensity distribution, and the plurality of light adjusting elements are disposed corresponding to at least a portion of the plurality of laser emitting elements according to uniformity of the sum beam light intensity distribution and with reference to uniformity of each sub-beam light intensity distribution.

8. The projection device according to claim 6, wherein the preset light intensity distribution is a condition: the illumination beam light intensity distribution meet that a difference value of light intensity in any two different positions is less than 10%.

9. The projection device according to claim 6, wherein the plurality of laser emitting elements are disposed in an array.

10. The projection device according to claim 6, wherein a diffusion angle of the output beam is less than or equal to 2 degrees.

* * * * *